US012412258B2

(12) United States Patent
Yoo et al.

(10) Patent No.: US 12,412,258 B2
(45) Date of Patent: Sep. 9, 2025

(54) SUBSTRATE INSPECTING UNIT AND SUBSTRATE TREATING APPARATUS INCLUDING THE SAME

(71) Applicant: SEMES CO., LTD., Chungcheongnam-do (KR)

(72) Inventors: Ji Hoon Yoo, Gyeonggi-do (KR); Kwang Sup Kim, Chungcheongnam-do (KR); Jong Min Lee, Gyeonggi-do (KR); Yeon Chul Song, Seoul (KR); Jun Ho Oh, Gyeonggi-do (KR); Young Ho Park, Incheon (KR); Myeong Jun Lim, Gyeonggi-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 402 days.

(21) Appl. No.: 18/076,401

(22) Filed: Dec. 7, 2022

(65) Prior Publication Data

US 2023/0206415 A1  Jun. 29, 2023

(30) Foreign Application Priority Data

Dec. 28, 2021  (KR) .................. 10-2021-0189467

(51) Int. Cl.
  *G06T 7/00*  (2017.01)
  *G06V 10/44*  (2022.01)
  (Continued)

(52) U.S. Cl.
  CPC ............ *G06T 7/0002* (2013.01); *G06V 10/44* (2022.01); *G06V 10/762* (2022.01); *G06V 10/764* (2022.01); *H04N 1/034* (2013.01)

(58) Field of Classification Search
  CPC ......... G06T 7/0002; G06T 2207/20081; G06T 2207/20084; G06T 2207/30124;
  (Continued)

(56) References Cited

U.S. PATENT DOCUMENTS 11,830,232 B2  11/2023  Shimazu et al.
11,922,317 B2   3/2024  Takehara
         (Continued)

FOREIGN PATENT DOCUMENTS

JP  2002099916 A  *  4/2002  ........... G06K 9/6215
JP  2016-71872        5/2016
         (Continued)

OTHER PUBLICATIONS

Office Action dated Aug. 9, 2024 for Korean Korean Patent Application No. 10-2021-0189467 and its English translation from Global Dossier.
         (Continued)

*Primary Examiner* — Samir A Ahmed
(74) *Attorney, Agent, or Firm* — WOMBLE BOND DICKINSON (US) LLP

(57) ABSTRACT

Provided are a substrate inspecting unit capable of reducing image data labeling work time through training image data set verification and semi-automatic image labeling, and at the same time, improving prediction performance by improving classification accuracy for data sets, and a substrate treating apparatus including the same. The substrate inspecting unit comprises a feature extracting module for extracting a feature from training data included in each class in response to a plurality of training data related to image data of a substrate being classified according to a predefined class, a validity evaluating module for evaluating validity of the feature, a class verifying module for verifying the predefined class, and a data reconstructing module for reconstructing the plurality of training data based on a feature determined as valid and a verified class, wherein reconstructed training data is utilized when inspecting the substrate.

20 Claims, 9 Drawing Sheets

(51) Int. Cl.
*G06V 10/762* (2022.01)
*G06V 10/764* (2022.01)
*H04N 1/034* (2006.01)

(58) Field of Classification Search
CPC ......... G06T 2207/30144; G06T 7/0004; G06T 7/001; G06T 2207/30121; G06V 10/44; G06V 10/762; G06V 10/764; G06V 10/774; G06V 10/776; G06V 10/40; G06V 10/77; G06V 10/82; H04N 1/034; G01N 21/8851; G01N 2021/8854; G01N 2021/8887; B41J 2/01; B41J 3/4073; B41J 29/00; G06N 3/08; G06N 3/088; G06N 20/00; G02F 1/1303
See application file for complete search history.

(56) References Cited

U.S. PATENT DOCUMENTS

| | | |
|---|---|---|
| 2018/0300576 A1 | 10/2018 | Dalyac et al. |
| 2019/0004504 A1* | 1/2019 | Yati .................. H01L 22/20 |
| 2020/0051235 A1* | 2/2020 | Majumdar ........... G01N 21/211 |
| 2020/0387756 A1* | 12/2020 | Takehara .............. G06N 20/00 |
| 2021/0099610 A1* | 4/2021 | Shimazu .............. H04N 5/2628 |

FOREIGN PATENT DOCUMENTS

| | | | |
|---|---|---|---|
| JP | 2019-159499 | 9/2019 | |
| JP | 2021056004 | 4/2021 | |
| KR | 10-2013-0060508 | 6/2013 | |
| KR | 10-2018-0118596 | 10/2018 | |
| KR | 10-1989793 | 6/2019 | |
| KR | 10-2020-0014938 | 2/2020 | |
| KR | 10-2021-0025701 | 3/2021 | |
| TW | 1664586 B * | 7/2019 | ........... G03H 1/0866 |

OTHER PUBLICATIONS

Notice of Allowance dated Apr. 25, 2025 for Korean Patent Application No. 10-2021-0189467 and its English translation by Google Translate.

* cited by examiner

SUBSTRATE INSPECTING UNIT AND SUBSTRATE TREATING APPARATUS INCLUDING THE SAME

This application claims the benefit of Korean Patent Application No. 10-2021-0189467, filed on Dec. 28, 2021, in the Korean Intellectual Property Office, the disclosure of which is incorporated herein by reference in its entirety.

BACKGROUND

1. Field

The present invention relates to a substrate inspecting unit and a substrate treating apparatus including the same. More particularly, it relates to a substrate inspecting unit capable of inspecting a substrate using image data, and a substrate treating apparatus including the same.

2. Description of the Related Art

When performing a printing process (e.g., RGB patterning) on a transparent substrate to manufacture a display device such as an LCD panel, PDP panel, LED panel, etc., a printing equipment including an inkjet head unit may be used.

SUMMARY

When a substrate is printed using an inkjet head unit, the substrate may be inspected when ink is discharged on the substrate in order to prevent mass production of a large amount of defective substrates. In this case, a camera module installed in the printing equipment may be used to acquire image data for inspecting the substrate.

When the substrate is inspected using image data, a deep learning process using the image data may be performed to increase the verification reliability.

However, in the data training stage during the deep learning process, if the classification criteria of the class is not clearly defined by the workers, or the image data set that is labeled incorrectly for each class is used to perform training, the degree of learning of the training model may drop, and ultimately, the prediction performance may also be deteriorated.

The technical object of the present invention to provide a substrate inspecting unit capable of reducing the image data labeling work time through training image data set verification and semi-auto image labeling, and at the same time, improving prediction performance by improving classification accuracy for data set, and a substrate treating apparatus including the same.

The objects of the present invention are not limited to the objects mentioned above, and other objects not mentioned will be clearly understood by those skilled in the art from the following description.

One aspect of the substrate inspecting unit of the present invention for achieving the above technical object comprises a feature extracting module for extracting a feature from training data included in each class in response to a plurality of training data related to image data of a substrate being classified according to a predefined class, a validity evaluating module for evaluating validity of the feature, a class verifying module for verifying the predefined class, and a data reconstructing module for reconstructing the plurality of training data based on a feature determined as valid and a verified class, wherein reconstructed training data is utilized when inspecting the substrate.

Wherein the feature extracting module extracts the features using a pre-trained model that is a result obtained by training using data related to the image data of the substrate equal to or greater than a reference amount.

Wherein the validity evaluating module applies a dimension reduction method to the feature to evaluate validity of the feature.

Wherein the validity evaluating module uses a t-SNE algorithm as the dimension reduction method.

Wherein the class verifying module verifies the predefined class using a non-hierarchical cluster analysis.

Wherein the class verifying module verifies the predefined class using a density-based clustering method.

Wherein the class verifying module verifies the predefined class using an unsupervised learning-based cluster analysis.

The substrate inspecting unit further comprises a data amount determining module for determining whether an amount of training data included in each class is equal to or greater than a reference amount.

Wherein the feature extracting module extracts the features using a pre-trained model that is a result obtained by training using data related to the image data of the substrate equal to or greater than the reference amount in response to an amount of training data included in each class being less than a reference amount.

The substrate inspecting unit further comprises a data labeling module for directly classifying the plurality of training data according to the predefined class.

The substrate inspecting unit further comprises a labeling information acquiring module for receiving information on training data classified by each class and information on the predefined class.

Wherein the plurality of training data is image data of at least one type of image data of a substrate in a good state and image data of a substrate in a defective state.

Wherein the plurality of training data is image data of a substrate, onto which a substrate treating solution is discharged.

The substrate inspecting unit further comprises a data processing module for processing the image data of the substrate in response to acquiring the image data of the substrate, a reference data detecting module for detecting reference data, a data analysis module for comparing and analyzing the image data of the substrate and the reference data, and a substrate determining module for determining whether the substrate is good or defective based on an analysis result between the image data of the substrate and the reference data.

Wherein the reference data detecting module determines a class related to the image data of the substrate from among the predefined class, and detects the reference data from among training data included in the determined class.

Wherein the substrate inspecting unit reconstructs the plurality of training data in response to an apparatus for treating the substrate being driven at least once.

Another aspect of the substrate inspecting unit of the present invention for achieving the above technical object comprises a feature extracting module for extracting a feature from training data included in each class in response to a plurality of training data related to image data of a substrate being classified according to a predefined class, a validity evaluating module for evaluating validity of the feature, a class verifying module for verifying the predefined class, and a data reconstructing module for reconstructing the plurality of training data based on a feature determined as valid and a verified class, wherein reconstructed training data is utilized when inspecting the substrate, wherein the feature extracting module extracts the features using transfer learning of a pre-trained model that is a result obtained by training using data related to the image data of the substrate equal to or greater than a reference amount, wherein a validity evaluating module evaluates validity of the feature by applying a dimension reduction method to the feature, wherein a class verifying module verifies the predefined class using DBSCAN based on unsupervised learning, wherein the plurality of training data is image data of the substrate, onto which a substrate treating solution is discharged, and is image data of at least one type of image data in a good state and image data in a defective state.

One aspect of the substrate treating apparatus of the present invention for achieving the above technical object comprises a process treating unit for supporting the substrate while the substrate is treated, an inkjet head unit for discharging a substrate treating solution onto the substrate, a gantry unit, in which the inkjet head unit is installed, and for moving the inkjet head unit on the substrate, and a substrate inspecting unit for inspecting the substrate, wherein the substrate inspecting unit comprises a feature extracting module for extracting a feature from training data included in each class in response to a plurality of training data related to image data of a substrate being classified according to a predefined class, a validity evaluating module for evaluating validity of the feature, a class verifying module for verifying the predefined class, and a data reconstructing module for reconstructing the plurality of training data based on a feature determined as valid and a verified class, wherein reconstructed training data is utilized when inspecting the substrate.

Wherein the feature extracting module extracts the feature using transfer learning of a pre-trained model that is a result obtained by training using data related to the image data of the substrate equal to or greater than a reference amount.

Wherein the class verifying module verifies the predefined class using DBSCAN based on unsupervised learning.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
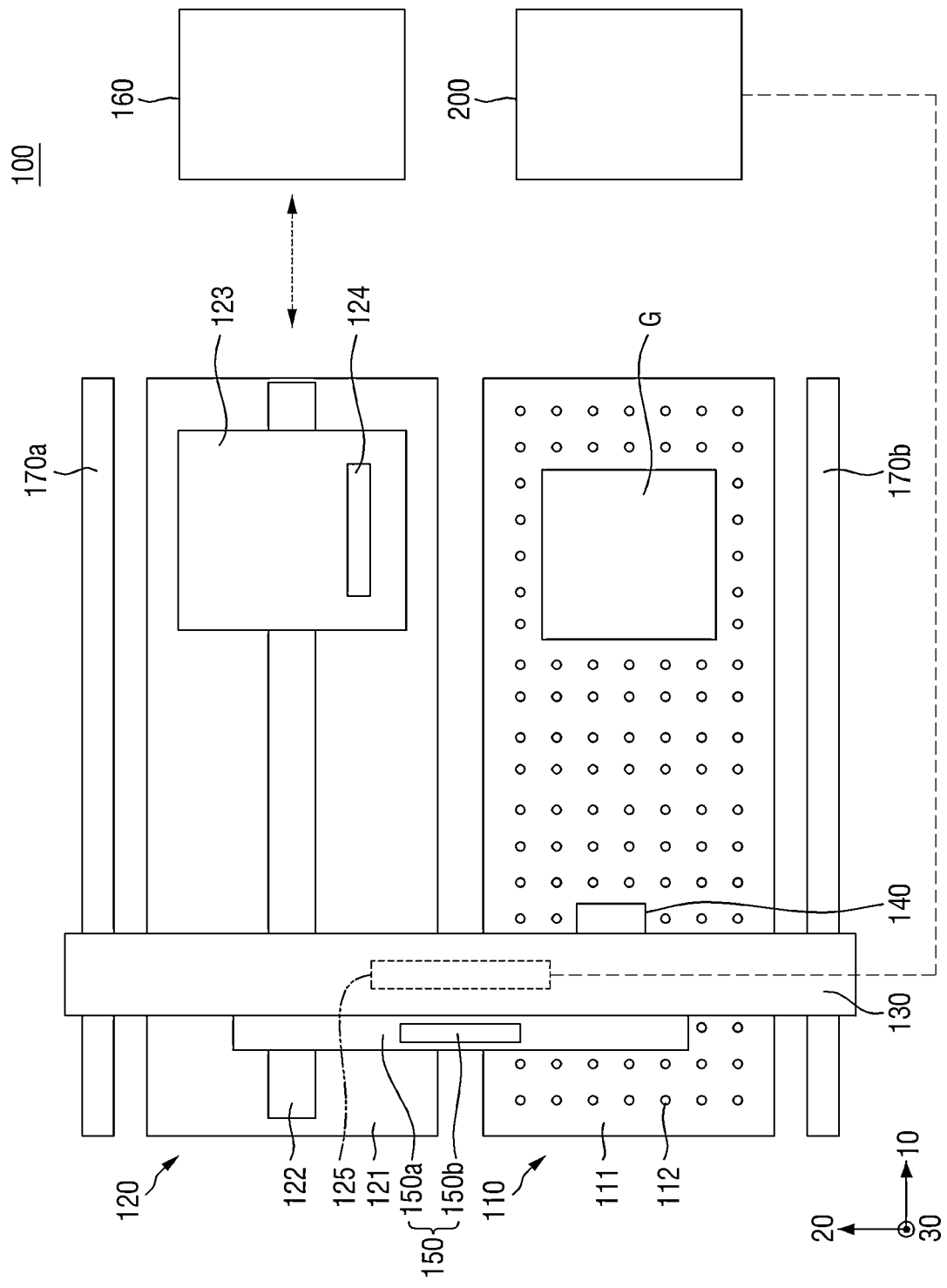
FIG. 1 is a diagram schematically illustrating an internal structure of a substrate treating apparatus according to an embodiment of the present invention.

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

When an element or layer is referred as being located "on" another element or layer, it includes not only being located directly on the other element or layer, but also with intervening other layers or elements. On the other hand, when an element is referred as being "directly on" or "immediately on," it indicates that no intervening element or layer is interposed.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present disclosure.

The terminology used herein is for the purpose of describing the embodiments and is not intended to limit the present disclosure. In the present disclosure, the singular also includes the plural, unless specifically stated otherwise in the phrase. As used herein, "comprises" and/or "comprising" refers to that components, steps, operations and/or elements mentioned does not exclude the presence or addition of one or more other components, steps, operations and/or elements.

Unless otherwise defined, all terms (including technical and scientific terms) used herein may be used with the meaning commonly understood by those of ordinary skill in the art to which the present invention belongs. In addition, terms defined in a commonly used dictionary are not to be interpreted ideally or excessively unless clearly defined in particular.

Hereinafter, embodiments of the present disclosure will be described in detail with reference to the accompanying drawings, and in the description with reference to the accompanying drawings, the same or corresponding components are given the same reference numbers, regardless of reference numerals in drawings, and an overlapped description therewith will be omitted.

The present invention relates to a substrate inspecting unit for inspecting a substrate based on image data of the substrate, and a substrate treating apparatus including the same. A more detailed description of the substrate inspecting unit will be described later, and here, the substrate treating apparatus will be described first.

FIG. 1 is a diagram schematically illustrating an internal structure of a substrate treating apparatus according to an embodiment of the present invention.

The substrate treating apparatus 100 treats a substrate G (e.g., a glass substrate) used for manufacturing a display apparatus. The substrate treating apparatus 100 may be provided as an inkjet equipment for printing the substrate G by jetting the substrate treating solution onto the substrate G using the inkjet head unit 140.

The substrate treating apparatus 100 may use ink as a substrate treating solution. Here, the substrate treating solution refers to a chemical solution used to print the substrate G. The substrate treating solution may be, for example, quantum dot (QD) ink including ultrafine semiconductor particles, and the substrate treating apparatus 100 may be provided as, for example, QD (Quantum Dot) CF (Color Filter) inkjet equipment. The substrate treating apparatus 100 may perform pixel printing on the substrate G using the substrate treating solution, and may be provided as a circulation system inkjet equipment to prevent the nozzles from being clogged by the substrate treating solution.

Referring to FIG. 1, the substrate treating apparatus 100 may include a process treating unit 110, a maintenance unit 120, a gantry unit 130, an inkjet head unit 140, substrate treating solution supply unit 150, a controller 160, and a substrate inspecting unit 200.

The process treating unit 110 supports the substrate G while the PT operation is performed on the substrate G. Here, the PT operation refers to printing the substrate G using a substrate treating solution.

The process treating unit 110 may support the substrate G using a non-contact method. The process treating unit 110 may support the substrate G by levitating the substrate G in the air using, for example, air. However, the present embodiment is not limited thereto. The process treating unit 110 may support the substrate G using a contact method. The process treating unit 110 may support the substrate G using, for example, a support member having a seating surface provided thereon.

The process treating unit 110 may move the substrate G in a state, in which the substrate G is supported by using air. The process treating unit 110 may be configured to include, for example, a first stage 111 and an air hole 112.

The first stage 111 serves as a base, and is provided so that the substrate G can be seated thereon. The air holes 112 may be formed through the upper surface of the first stage 111, and a plurality of air holes 112 may be formed in a printing zone on the first stage 111.

The air hole 112 may spray air in the upper direction (the third direction 30) of the first stage 111. The air hole 112 may levitate the substrate G seated on the first stage 111 through this.

Although not shown in FIG. 1, the process treating unit 110 may further include a gripper and a guide rail. When the substrate G moves in the longitudinal direction (the first direction 10) of the first stage 111, the gripper grips the substrate G to prevent the substrate G from being deviated from the first stage 111. When the substrate G moves, the gripper may move in the same direction as the substrate G along the guide rail while gripping the substrate G. The gripper and the guide rail may be provided outside the first stage 111.

The maintenance unit 120 measures a discharge position (i.e., an impacting spot) of the substrate treating solution on the substrate G, whether the substrate treating solution is discharged, and the like. The maintenance unit 120 may measure the discharge position of the substrate treating solution with respect to each of the plurality of nozzles provided in the inkjet head unit 140, whether the substrate treating solution is discharged, etc., and allow the obtained measurement result to be provided to the controller 160.

The maintenance unit 120 may include, for example, a second stage 121, a third guide rail 122, a first plate 123, a calibration board 124 and a vision module 125.

Like the first stage 111, the second stage 121 serves as a base and may be disposed in parallel with the first stage 111. The second stage 121 may include a maintenance zone thereon. The second stage 121 may be provided to have the same size as the first stage 111, but may be provided to have a size smaller or larger than that of the first stage 111.

The third guide rail 122 guides the movement path of the first plate 123. The third guide rail 122 may be provided on the second stage 121 as at least one line along the longitudinal direction (the first direction 10) of the second stage 121. The third guide rail 122 may be implemented as, for example, an LM guide system (Linear Motor Guide System).

Although not shown in FIG. 1, the maintenance unit 120 may further include a fourth guide rail. Like the third guide rail 122, the fourth guide rail guides the movement path of the first plate 123, and may be provided on the second stage 121 as at least one line along the width direction (the second direction 20) of the second stage 121.

The first plate 123 moves on the second stage 121 along the third guide rail 122 and/or the fourth guide rail. The first plate 123 may move in parallel with the substrate G along the third guide rail 122, and may approach or move away from the substrate G along the fourth guide rail.

The calibration board 124 is for measuring the discharge position of the substrate treating solution on the substrate G.

The calibration board 124 may be installed on the first plate 123 including an alignment mark, a ruler, and the like, and may be provided along the longitudinal direction (first direction 10) of the first plate 123.

The vision module 125 includes a camera module, and acquires image information on the substrate G. The image information of the substrate G obtained by the vision module 125 may include information on whether or not the substrate treating solution is discharged, the discharge position of the substrate treating solution, the discharge amount of the substrate treating solution, the discharge area of the substrate treating solution, etc. Meanwhile, the vision module 125 may acquire and provide information on the calibration board 124 as well as image information on the substrate G, onto which the substrate treating solution is discharged.

When treating the substrate G, the vision module 125 may acquire image information on the substrate G in real time. The vision module 125 may acquire image information by photographing the substrate G in the longitudinal direction (the first direction 10). In this case, the vision module 125 may include a line scan camera. Also, the vision module 125 may acquire image information by photographing the substrate G for each area of a predetermined size. In this case, the vision module 125 may include an area scan camera.

The vision module 125 may be attached to a bottom surface or a side surface of the gantry unit 130 to obtain image information of the substrate G, onto which the substrate treating solution is discharged. However, the present embodiment is not limited thereto. The vision module 125 may be attached to the side surface of the inkjet head unit 140. Meanwhile, at least one vision module 125 may be provided in the substrate treating apparatus 100, and may be fixedly installed or movably installed.

The gantry unit 130 supports the inkjet head unit 140. The gantry unit 130 may be provided above the first stage 111 and the second stage 121 so that the inkjet head unit 140 can discharge the substrate treating solution onto the substrate G.

The gantry unit 130 may be provided on the first stage 111 and the second stage 121 with the width direction (the second direction 20) of the first stage 111 and the second stage 121 as the longitudinal direction. The gantry unit 130 may move in a longitudinal direction (the first direction 10) of the first stage 111 and the second stage 121 along the first guide rail 170*a* and the second guide rail 170*b*. Meanwhile, the first guide rail 170*a* and the second guide rail 170*b* may be provided outside the first stage 111 and the second stage 121 along the longitudinal direction (the first direction 10) of the first stage 111 and the second stage 121.

Meanwhile, although not shown in FIG. 1, the substrate treating apparatus 100 may further include a gantry moving unit. The gantry moving unit slidably moves the gantry unit 130 along the first guide rail 170*a* and the second guide rail 170*b*. The gantry moving unit may be installed inside the gantry unit 130.

The inkjet head unit 140 discharges the substrate treating solution onto the substrate G in the form of droplets. The inkjet head unit 140 may be installed on a side surface or a bottom surface of the gantry unit 130.

At least one inkjet head unit 140 may be installed in the gantry unit 130. When a plurality of inkjet head units 140 are installed in the gantry unit 130, the plurality of inkjet head units 140 may be arranged in a line along the longitudinal direction (the second direction 20) of the gantry unit 130. In addition, each of the plurality of inkjet head units 140 may operate independently, and conversely, they may operate uniformly.

The inkjet head unit 140 may move along the longitudinal direction (the second direction 20) of the gantry unit 130 to be located at a desired point on the substrate G. However, the present embodiment is not limited thereto. The inkjet head unit 140 may move along the height direction (the third direction 30) of the gantry unit 130, and may also rotate clockwise or counterclockwise.

Meanwhile, the inkjet head unit 140 may be installed to be fixed to the gantry unit 130. In this case, the gantry unit 130 may be provided to be movable.

Although not shown in FIG. 1, the substrate treating apparatus 100 may further include an inkjet head moving unit. The inkjet head moving unit linearly moves or rotates the inkjet head unit 140.

Although not shown in FIG. 1, the inkjet head unit 140 may include a nozzle plate, a plurality of nozzles, a piezoelectric element, and the like. The nozzle plate constitutes the body of the inkjet head unit 140. A plurality of (e.g., 128, 256, etc.) nozzles may be provided in multiple columns and rows at regular intervals under the nozzle plate, and the piezoelectric element may be provided as many as the number corresponding to the number of nozzles in the nozzle plate. When the inkjet head unit 140 is configured as described above, the substrate treating solution may be discharged onto the substrate G through the nozzle according to the operation of the piezoelectric element.

Meanwhile, the inkjet head unit 140 may independently adjust the discharge amount of the substrate treating solution provided through each nozzle according to a voltage applied to the piezoelectric element.

The substrate treating solution supply unit 150 supplies ink to the inkjet head unit 140. The substrate treating solution supply unit 150 may include a storage tank 150*a* and a pressure control module 150*b*.

The storage tank 150*a* stores the substrate treating solution, and the pressure control module 150*b* controls the internal pressure of the storage tank 150*a*. The storage tank 150*a* may supply an appropriate amount of the substrate treating solution to the inkjet head unit 140 based on the pressure provided by the pressure control module 150*b*.

The controller 160 controls the overall operation of each unit constituting the substrate treating apparatus 100. The controller 160 may control the operation of, for example, the air hole 112 and the gripper of the process treating unit 110, the vision module 125 of the maintenance unit 120, the gantry unit 130, the inkjet head unit 140, and the pressure control module 150*b* of the substrate treating solution supply unit 150.

The controller 160 may be implemented as a computer or a server, including a process controller, a control program, an input module, an output module (or a display module), a memory module, and the like. In the above, the process controller may include a microprocessor that executes a control function for each component constituting the substrate treating apparatus 100, and the control program may execute various treating of the substrate treating apparatus 100 according to the control of the process controller. The memory module stores programs for executing various treating of the substrate treating apparatus 100 according to various data and treating conditions, that is, treating recipes.

Meanwhile, the controller 160 may also serve to perform maintenance on the inkjet head unit 140. For example, the controller 160 may correct the discharge position of the substrate treating solution of each nozzle provided in the inkjet head unit 140 based on the measurement result of the maintenance unit 120, or may perform cleaning operation by detecting a defective nozzle (that is, a nozzle that does not discharge the substrate treating solution) among a plurality of nozzles.

The substrate inspecting unit 200 may inspect the substrate G based on image data of the substrate G acquired by the vision module 125. Specifically, when the image data of the substrate G is obtained by the vision module 125, the substrate inspecting unit 200 may process the image data, and then compare and analyze the image data with reference data to inspect the substrate G. The substrate inspecting unit 200 may be interlocked with the vision module 125 for this purpose, and like the controller 160, it may be provided as a computer, a server, or the like, including a process controller, a control program, an input module, an output module (or a display module), a memory module, and the like.

The substrate inspecting unit 200 may classify training data through deep learning. The substrate inspecting unit 200 may detect the reference data to be compared with the image data of the substrate G among the training data classified in this way, and compare the image data of the substrate G with the reference data to inspect the substrate G.

In the above, the training data may be image data of the substrate G having various shapes. In addition, the training data may include at least one type of image data of image data of a good substrate that can be used for manufacturing a display device and image data of a defective substrate that cannot be used for manufacturing a display device.

If the training data is classified through deep learning, the verification reliability can be improved when the substrate G is inspected using the image data. However, as described above, in the data training stage of deep learning, when the classification criteria of the class are not clearly defined by the workers, or training is performed using the image data set that is labeled incorrectly for each class, the degree of learning of the training model may drop, and ultimately prediction performance may also be deteriorated.

In this embodiment, the substrate inspecting unit 200 can reduce the image data labeling work time through training image data set verification and semi-auto image labeling, at the same time, improve the prediction performance by improving the classification accuracy for the data set. Hereinafter, these methods will be described in detail.

Figure 2:
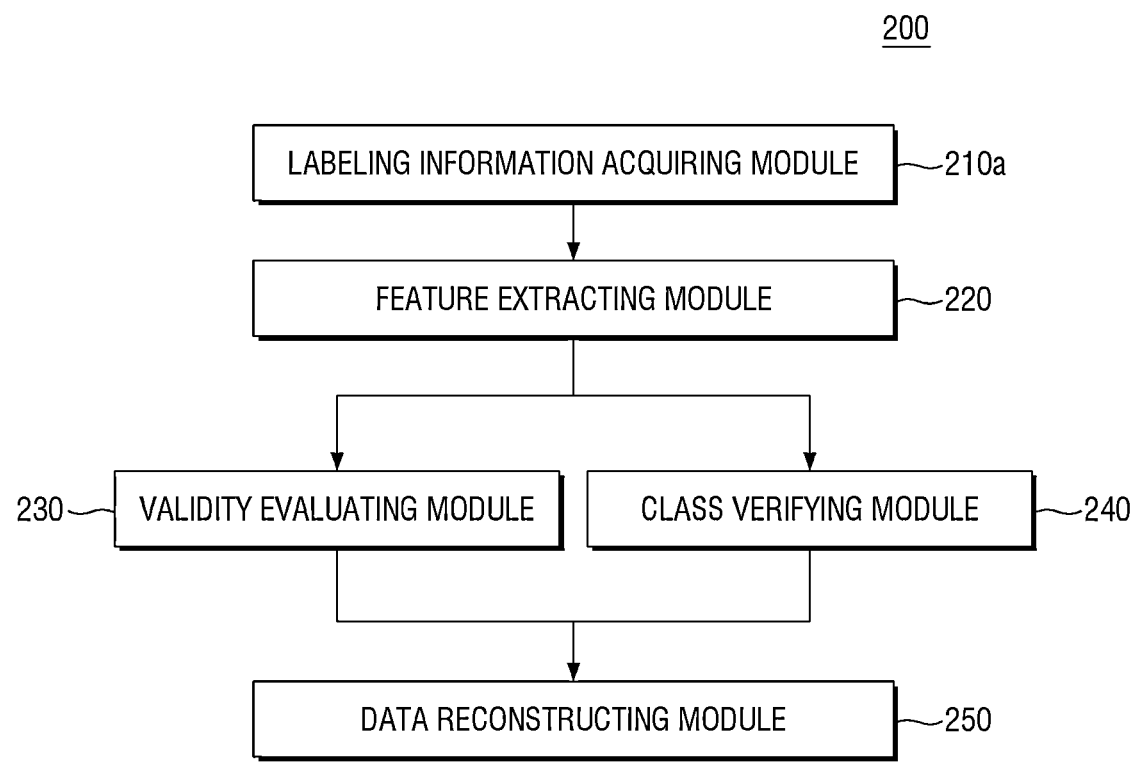
FIG. 2 is a first exemplary diagram schematically illustrating an internal module related to a first method of a substrate inspecting unit constituting a substrate treating apparatus according to an embodiment of the present invention.

FIG. 2 is a first exemplary diagram schematically illustrating an internal module related to a first method of a substrate inspecting unit constituting a substrate treating apparatus according to an embodiment of the present invention. The substrate inspecting unit 200 may classify image data of the substrate G using deep learning. In this case, the substrate inspecting unit 200 may include a labeling information acquiring module 210a, a feature extracting module 220, a validity evaluating module 230, a class verifying module 240, and a data reconstructing module 250.

The labeling information acquiring module 210a acquires labeling information related to the labeling operation when a labeling operation is performed on a plurality of training data. The labeling information acquiring module 210a may acquire information on the classification class used during labeling, information on the training data classified by each class by labeling (that is, information on the labeled training data), etc. as labeling information.

A plurality of workers may perform manual image labeling on a plurality of training data according to a predefined classification class. When manual image labeling for a plurality of training data is completed by a plurality of workers, the labeling information acquiring module 210a may acquire the labeling information from the result. In this case, the labeling information acquiring module 210a may receive labeling information through an input means such as a keyboard or a touch screen, and it is also possible to receive the labeling information through a wired/wireless communication means such as WiFi.

When a plurality of training data is classified by each class by manual image labeling, the feature extracting module 220 extracts a feature from the training data included in each class. Here, the feature refers to a characteristic (attribute value) of data to be predicted or classified.

The feature extracting module 220 may extract features based on a pre-trained model when extracting features from training data included in each class.

In order to improve the quality of a deep learning model, it should be trained using a very large amount of data. Therefore, in relation to each class, a model trained using a large amount of data in advance, that is, a pre-trained model can be applied to feature extraction. When extracting feature using the pre-trained model, the feature extracting module 220 may extract features from training data included in each class through transfer learning based on the pre-trained model.

Figure 3:
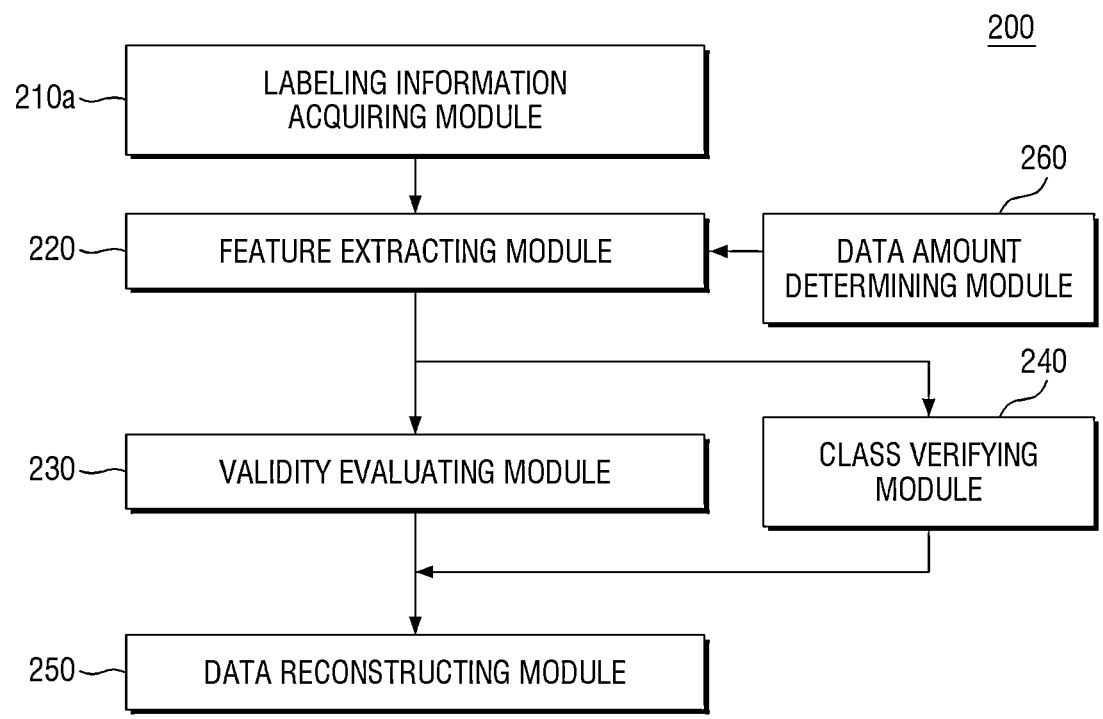
FIG. 3 is a second exemplary diagram schematically illustrating an internal module related to a first method of a substrate inspecting unit constituting a substrate treating apparatus according to an embodiment of the present invention.

If the training data included in each class is a large amount of data, the feature extracting module 220 may extract features based on the training data included in each class. That is, the feature extracting module 220 may not use a pre-trained model. In consideration of this aspect, the substrate inspecting unit 200 may further include a data amount determining module 260 as shown in FIG. 3. FIG. 3 is a second exemplary diagram schematically illustrating an internal module related to a first method of a substrate inspecting unit constituting a substrate treating apparatus according to an embodiment of the present invention.

The data amount determining module 260 determines whether the training data included in each class is a large amount of data. The data amount determining module 260 may make the determination based on whether the amount (or number) of training data included in each class is greater than or equal to a reference value. Specifically, if the amount of training data included in each class is greater than or equal to the reference value, the data amount determining module 260 may determine that the training data included in each class is a large amount of data, and if the amount of training data included in each class is less than the reference value, the data amount determining module 260 may determine that the training data included in each class is not a large amount of data.

On the other hand, the data amount determining module 260 is also possible to determine whether the plurality of training data, on which the labeling operation is performed, is a large amount of data. In this case, if the plurality of training data, on which the labeling operation is performed, is a large amount of data, the feature extracting module 220 may perform feature extraction based on the training data included in each class without using the pre-trained model.

It will be described again with reference to FIG. 2.

The validity evaluating module 230 evaluates the validity of the features extracted by the feature extracting module 220. The validity evaluating module 230 may evaluate the validity of each feature by applying a dimension reduction method to the features. The validity evaluating module 230 may improve the calculation and processing speed of the substrate inspecting unit 200 related to the image data classification method by removing the features determined as invalid through the validity evaluation of each feature.

When evaluating the validity of each feature, the validity evaluating module 230 may use a t-distributed stochastic neighbor embedding (t-SNE) algorithm as a dimension reduction method. However, the present embodiment is not limited thereto. The validity evaluating module 230 may also use the UMAP (Uniform Manifold Approximation and Projection) algorithm as a dimension reduction method.

The class verifying module 240 verifies a predefined class. Here, the predefined class refers to a class used for manual image labeling.

When verifying the predefined class, the class verifying module 240 may verify the predefined class based on the suitability for each predefined class classification criterion. In this case, the class verifying module 240 may verify a predefined class using non-hierarchical clustering, and in particular, the class verifying module 240 may use an unsupervised learning-based non-hierarchical cluster analysis to verify a predefined class.

When using the non-hierarchical cluster analysis, the class verifying module 240 may verify a predefined class using a density-based clustering method. For example, the class verifying module 240 may verify a predefined class by using Density Based Spatial Clustering of Applications with Noise (DBSCAN). However, the present embodiment is not limited thereto. The class verifying module 240 may also verify a predefined class using a center-based clustering method. For example, the class verifying module 240 may verify a predefined class by using a k-means clustering algorithm.

When the validity evaluation of the feature and the verification of the class are completed, the data reconstructing module 250 performs clustering on a plurality of training data based on the feature determined as valid and the verified class. That is, in the case of training data clustered in a class verified for a plurality of training data, the data reconstructing module 250 determines that it is suitable for the verified class and leaves it, and in the case of training data that is not clustered in the verified class, the data reconstructing module 250 determines that it not suitable for the verified class and excludes it, so that clustering may be performed on a plurality of training data.

The substrate inspecting unit 200 includes the above-described labeling information acquiring module 210a, the feature extracting module 220, the validity evaluating module 230, the class verifying module 240 and the data reconstructing module 250, so that it is possible to classify training data, that is, the image data of the substrate G. This method of the substrate inspecting unit 200 can obtain the effect that it becomes possible to secure more consistent training image data than the conventional method, in which workers subjectively classify the training data.

In addition, in the deep learning framework (DL Framework) consisting of image data set collection stage (Collect Image Dataset), image data set training stage (Training Image Dataset), image data set validation stage (Validation Image Dataset), model architecture design stage (Design Model Architecture), model training stage (Train Model), model evaluation stage (Evaluate Model) and test image prediction stage (Predict Test Image), unlike the conventional method performed in the image data set collection stage, it can have an effect that the method of the present invention could made in the image data set training stage.

Meanwhile, the substrate inspecting unit 200 may reclassify the training data when the substrate treating apparatus 100 operates at least once.

The substrate inspecting unit 200 described above with reference to FIG. 2 is an example of classifying image data of the substrate G using deep learning, and in this case, the substrate inspecting unit 200 does not perform a labeling operation on a plurality of training data. However, the present embodiment is not limited thereto. The substrate inspecting unit 200 may also perform a labeling operation on a plurality of training data. Hereinafter, this will be described.

Figure 4:
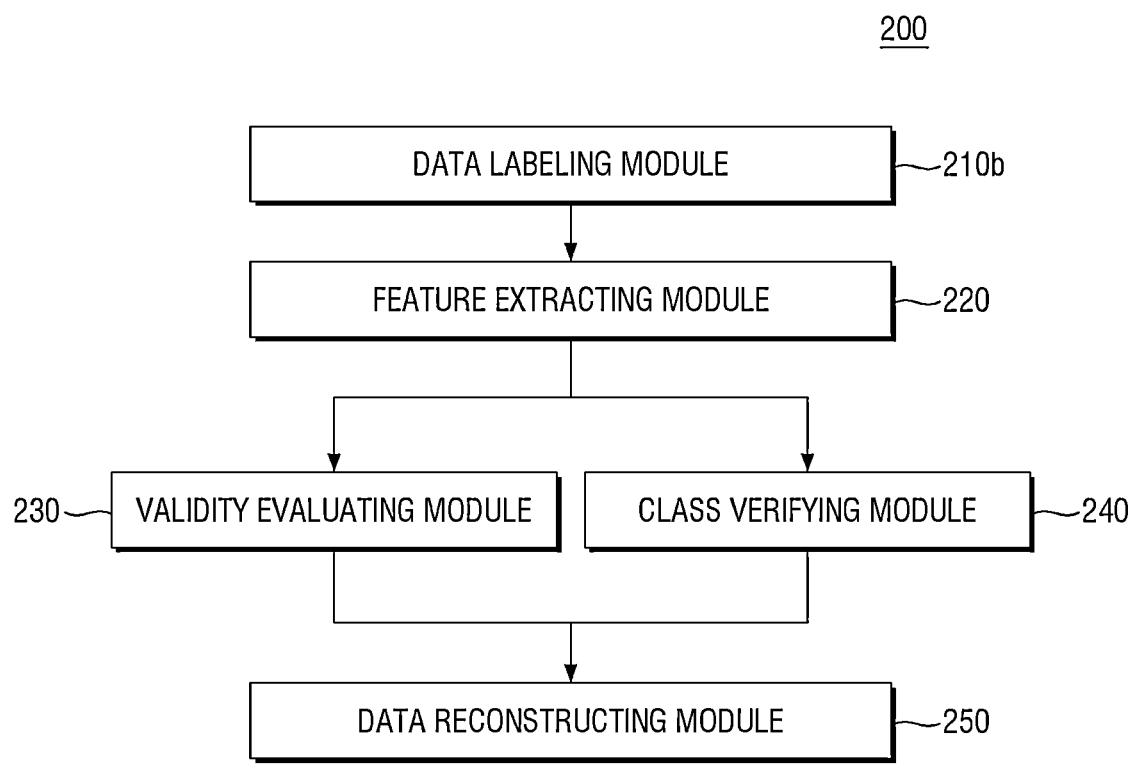
FIG. 4 is a third exemplary diagram schematically illustrating an internal module related to a first method of a substrate inspecting unit constituting a substrate treating apparatus according to an embodiment of the present invention.

FIG. 4 is a third exemplary diagram schematically illustrating an internal module related to a first method of a substrate inspecting unit constituting a substrate treating apparatus according to an embodiment of the present invention. According to FIG. 4, the substrate inspecting unit 200 may include a data labeling module 210b, a feature extracting module 220, a validity evaluating module 230, a class verifying module 240, and a data reconstructing module 250.

The feature extracting module 220, the validity evaluating module 230, the class verifying module 240, and the data reconstructing module 250 have been described above with reference to FIG. 2, and a detailed description thereof will be omitted herein.

The data labeling module 210b classifies a plurality of training data into respective classes according to a predetermined class. Compared with the substrate inspecting unit 200 of FIG. 2, the substrate inspecting unit 200 of FIG. 2 does not classify a plurality of training data by each class, whereas the substrate inspecting unit 200 of FIG. 4 directly classifies a plurality of training data by each class through a data labeling module 210b.

Figure 5:
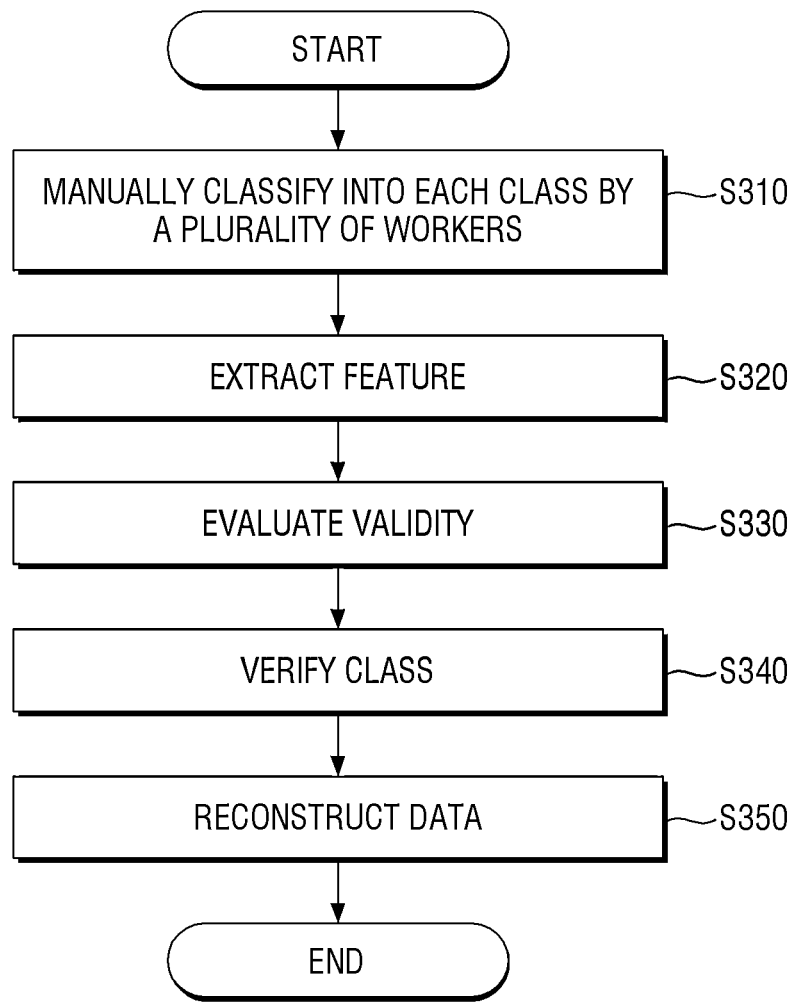
FIG. 5 is a first exemplary diagram illustrating a first method of a substrate inspecting unit constituting a substrate treating apparatus according to an exemplary embodiment of the present invention.

Next, a method of classifying image data of the substrate inspecting unit 200 will be described. FIG. 5 is a first exemplary diagram illustrating a first method of a substrate inspecting unit constituting a substrate treating apparatus according to an exemplary embodiment of the present invention. The following description refers to FIG. 5.

First, when a plurality of training data is manually classified into each class by a plurality of workers (S310), the feature extracting module 220 extracts a feature from the training data included in each class (S320). The feature extracting module 220 may extract features from training data included in each class through transfer learning based on a pre-trained model.

Thereafter, the validity evaluating module 230 evaluates the validity of the features extracted by the feature extracting module 220 (S330). The validity evaluating module 230 may evaluate the validity of each feature using a dimension reduction method (e.g., t-SNE algorithm).

Thereafter, the class verifying module 240 verifies a predefined class (that is, a class used to classify a plurality of training data in step S310) (S340). The class verifying module 240 may verify a predefined class using DBSCAN based on unsupervised learning.

Thereafter, the data reconstructing module 250 performs clustering on a plurality of training data based on the features determined as valid and the verified class by the validity evaluating module 230 and the class verifying module 240 (S350).

Meanwhile, as described above, if the training data included in each class is a large amount of data, the feature extracting module 220 does not use transfer learning based on the pre-trained model, but may extract features based on the training data included in each class. Accordingly, the image data classification method of the substrate inspecting unit 200 may be performed as follows.

Figure 6:
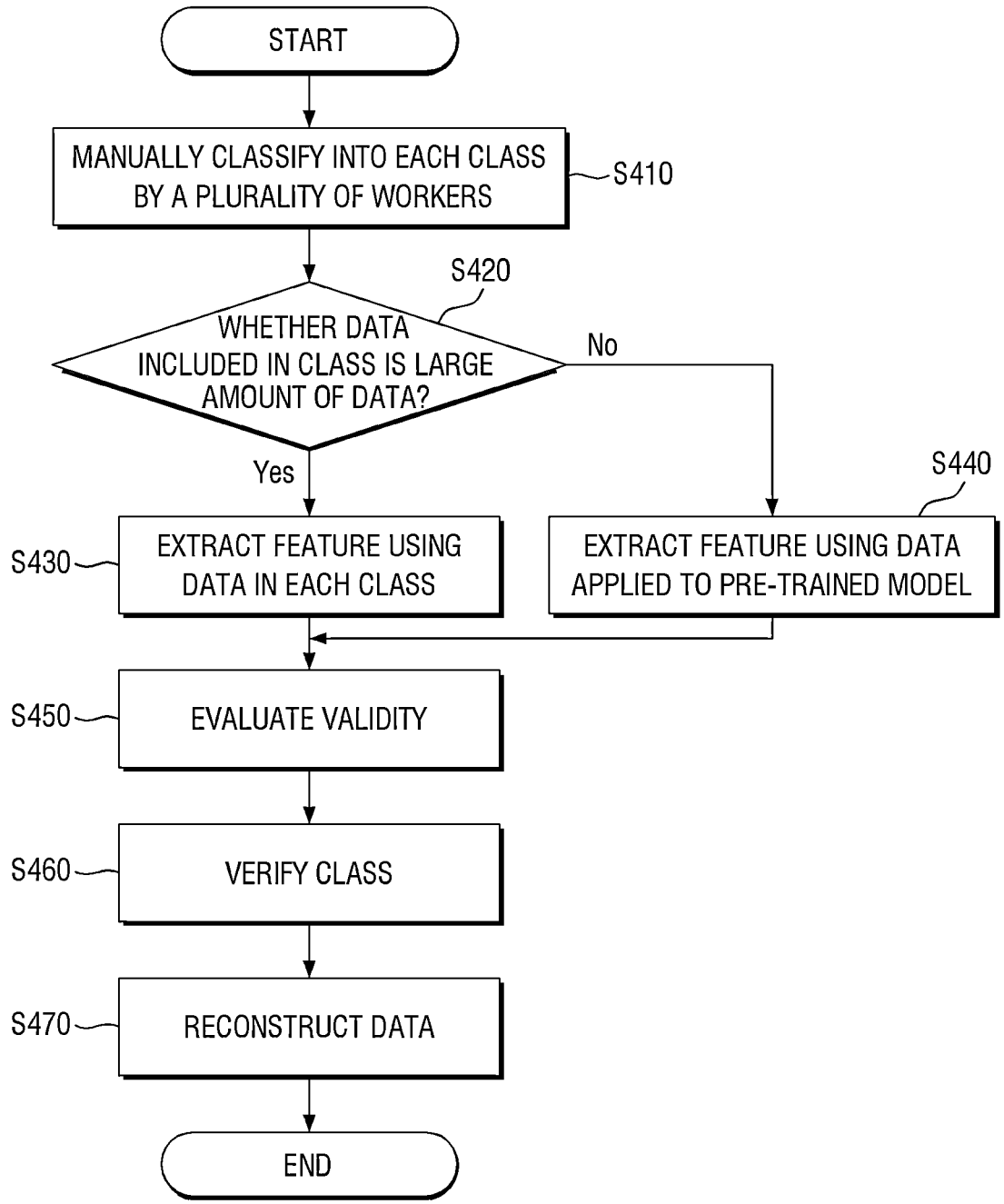
FIG. 6 is a second exemplary diagram illustrating a first method of a substrate inspecting unit constituting a substrate treating apparatus according to an exemplary embodiment of the present invention.

FIG. 6 is a second exemplary diagram illustrating a first method of a substrate inspecting unit constituting a substrate treating apparatus according to an exemplary embodiment of the present invention. The following description refers to FIG. 6.

First, when a plurality of training data is manually classified into each class by a plurality of workers (S410), the data amount determining module 260 determines whether the training data included in each class is a large amount of data. (S420).

Here, when it is determined that the training data included in each class is a large amount of data, the feature extracting module 220 extracts features using the training data included in each class (S430).

On the other hand, if it is determined that the training data included in each class is not a large amount of data, the feature extracting module 220 extracts features using data applied to the pre-trained model (S440). Here, the pre-trained model may be composed of image data related to training data included in each class.

Thereafter, the validity evaluating module 230 evaluates the validity of the features extracted by the feature extracting module 220 (S450).

Thereafter, the class verifying module 240 verifies a predefined class (that is, a class used to classify a plurality of training data in step S410) (S460).

Thereafter, the data reconstructing module 250 performs clustering on a plurality of training data based on the features determined as valid and the verified class by the validity evaluating module 230 and the class verifying module 240 (S470).

Figure 7:
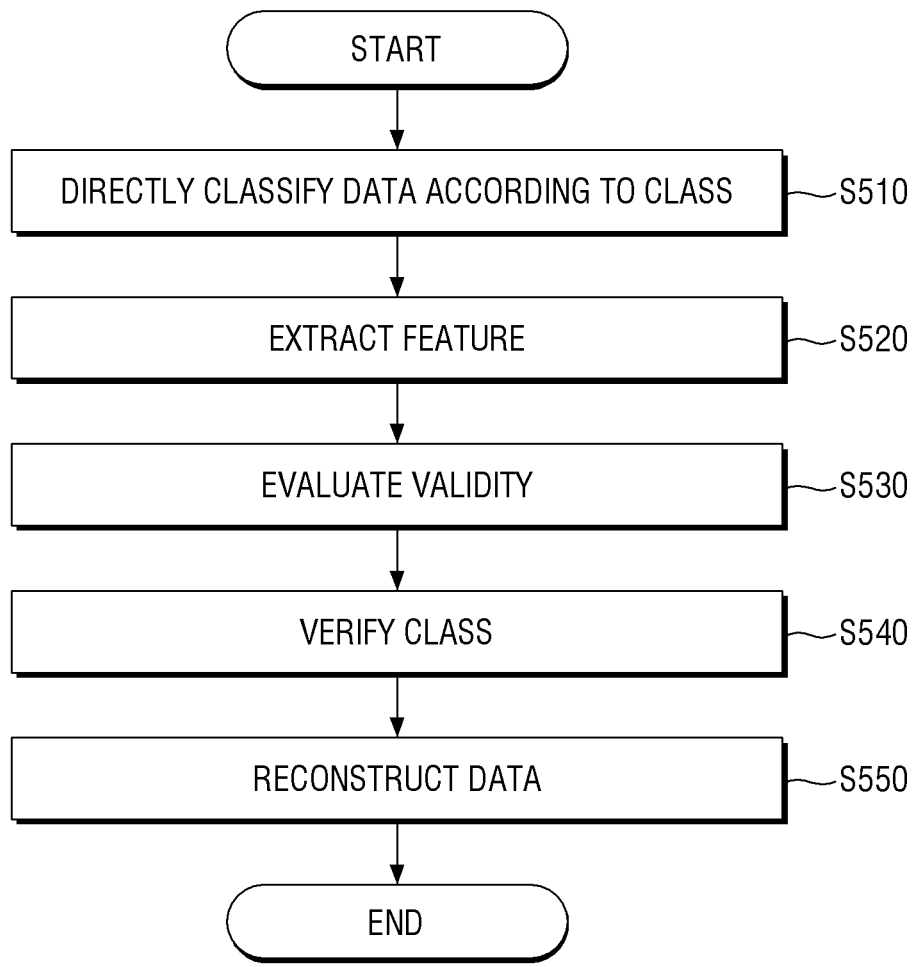
FIG. 7 is a third exemplary diagram illustrating a first method of a substrate inspecting unit constituting a substrate treating apparatus according to an exemplary embodiment of the present invention.

On the other hand, it is also possible for the substrate inspecting unit 200 to directly perform a labeling operation on the plurality of training data. FIG. 7 is a third exemplary diagram illustrating a first method of a substrate inspecting unit constituting a substrate treating apparatus according to an exemplary embodiment of the present invention. The following description refers to FIG. 7.

First, the data labeling module 210b classifies a plurality of training data into each class according to a predetermined class (S510).

Thereafter, the feature extracting module 220 extracts features from the training data included in each class (S520).

Thereafter, the validity evaluating module 230 evaluates the validity of the features extracted by the feature extracting module 220 (S530).

Thereafter, the class verifying module 240 verifies a predefined class (that is, a class used to classify a plurality of training data in step S510) (S540).

Thereafter, the data reconstructing module 250 performs clustering on a plurality of training data based on the feature determined as valid and the verified class by the validity evaluating module 230 and the class verifying module 240 (S550).

The image data classification method of the substrate inspecting unit 200 has been described with reference to FIGS. 2 to 7 above. Hereinafter, a substrate inspecting method using image data of the substrate inspecting unit 200 will be described.

Figure 8:
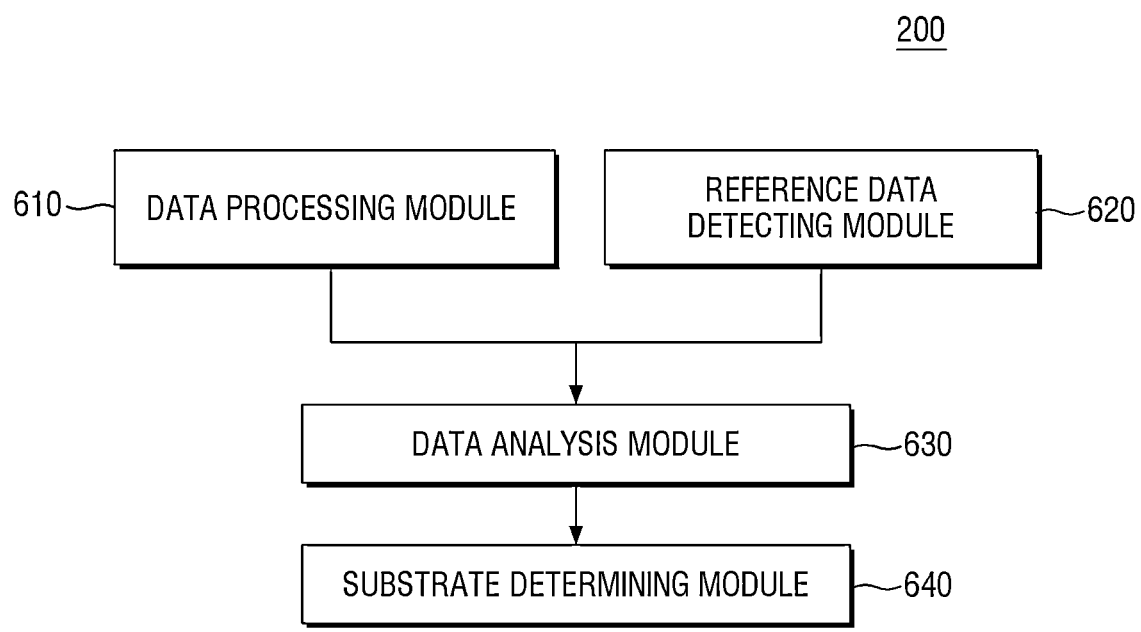
FIG. 8 is an exemplary diagram schematically illustrating an internal module related to a second method of a substrate inspecting unit constituting a substrate treating apparatus according to an embodiment of the present invention.
Figure 9:
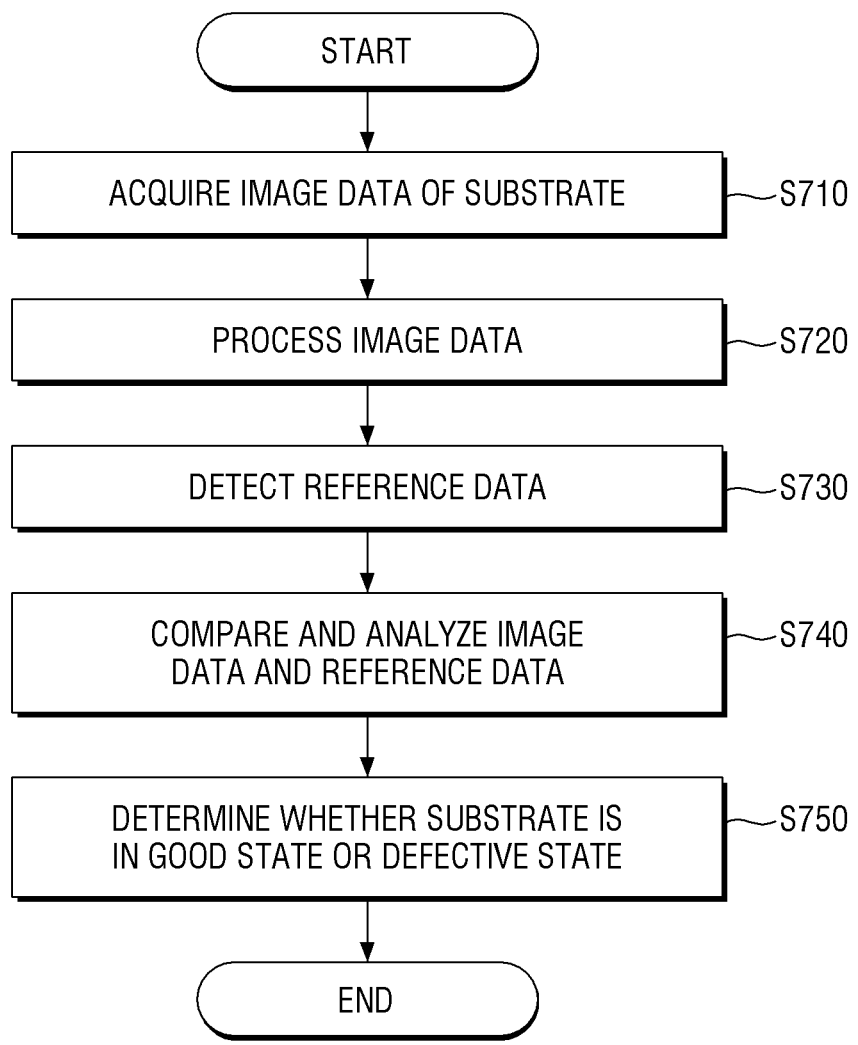
FIG. 9 is an exemplary diagram schematically illustrating a second method of a substrate inspecting unit constituting a substrate treating apparatus according to an embodiment of the present invention.

FIG. 8 is an exemplary diagram schematically illustrating an internal module related to a second method of a substrate inspecting unit constituting a substrate treating apparatus according to an embodiment of the present invention. And, FIG. 9 is an exemplary diagram illustrating a second method of a substrate inspecting unit constituting a substrate treating apparatus according to an exemplary embodiment of the present invention. The following description refers to FIGS. 8 and 9.

First, when image data of the substrate G is acquired by the vision module 125 (S710), the data processing module 610 of the substrate inspecting unit 200 processes the image data (S720). In the above, the image data of the substrate G acquired by the vision module 125 may be image data of the substrate G, onto which the substrate treating solution is discharged by the inkjet head unit 140.

Thereafter, the reference data detecting module 620 of the substrate inspecting unit 200 detects the reference data to be compared with the image data of the substrate G from among the plurality of training data classified by each class according to the image data classification method (S730). The reference data detecting module 620 may determine a class related to the image data of the substrate G from among the predefined classes, and then detect the reference data from among the training data classified into the corresponding class.

Although step S730 may be performed after step S720, it is also possible to be performed simultaneously with step S720. Alternatively, step S730 may be performed before step S720. Meanwhile, in the present embodiment, it is also possible to perform the image data classification method before performing the S730 step, and then perform the S730 step.

Thereafter, the data analysis module 630 of the substrate inspecting unit 200 compares and analyzes the image data of the substrate G and the reference data (S740).

Thereafter, the substrate determining module 640 of the substrate inspecting unit 200 determines whether the substrate G is in a good state or a defective state based on the comparison and analysis results (S750). For example, when pixel printing is performed on the substrate G, the substrate determining module 640 may determine that the substrate G is in a good state if it is determined that there is no line defect or area spot due to an impact error on the substrate G, and determine that the substrate G is in a defective state if it is determined that there are the line defects or area spots on the substrate G.

The present invention described above relates to a method performed by the substrate inspecting unit 200, and to an unsupervised learning technique-based semi-auto image labeling algorithm. The algorithm relates to a semi-automatic labeling algorithm that can improve prediction accuracy by verifying and supplementing training image data manually labeled by workers in the initial stage of deep learning application.

In general, training data used in deep learning algorithms is configured by pre-defining classification classes according to the purpose and then performing labeling. As the training data is configured as designed in advance, it is used as the input data of the deep learning algorithm without a separate verification operation.

However, in the case of deep learning-based good/defective image inspection in the manufacturing field, a separate verification operation on training data is required. The reason is that it is difficult to predict in advance what type of good/defective image data will be generated before the operation of the equipment. Therefore, there is a problem in that it is difficult to pre-define classes and perform labeling, unlike the general training data configuration.

In addition, in the Collecting Image Dataset stage, N workers define classes and perform manual labeling, and finally combine each class to configure the training data. In this stage, since the subjective opinions of the N workers should be individually reflected, it is necessary to verify whether the training data is configured according to the class.

The prediction accuracy of deep learning algorithms is greatly affected by the training data configuration, model architecture, and the number of training iterations. Among them, the training data configuration is the most influential factor.

The deep learning framework proposed in the present invention aims to improve classification prediction accuracy for manual labeling of N workers by verifying and reconstructing training data according to a predefined class criterion (Semi-auto Labeling). In the present invention, it is expected that the reliability of the training data configuration will be improved through this, so that it is possible to more accurately predict and classify the occurrence of various defects in the equipment.

The deep learning framework proposed in the present invention proceeds specifically as follows. As previously described in the conventional problem, it is necessary to verify the training data in the manufacturing industry, and through this, labeling is performed again to reconstruct the training data to improve prediction accuracy. In the present invention, a series of processes for verifying and reconstructing training image data as described above is defined as semi-auto image labeling.

First, N workers perform manual image labeling according to a predefined classification class.

Then, for each class in the primary manual image-labeled training data, features are extracted through transfer learning based on a pre-trained model specialized for general-purpose image data.

Thereafter, the validity of the features is identified by reducing the dimensions of the features extracted through the t-SNE algorithm, and thus the calculation processing speed is improved.

Thereafter, the suitability of each predefined class classification criterion is verified using DBSCAN based on unsupervised learning.

The training image data is reconstructed by leaving the clustered image as suitable for the corresponding class and excluding the non-clustered image as being unsuitable for the corresponding class. The above process is also performed for the remaining classes to reconstruct the entire training image data.

The features of the present invention described above will be summarized once again as follows.

First, in the initial stage of deep learning, after verifying the data consistency based on the unsupervised learning method on the training image data manually labeled by N workers, training image data more accurately classified through semi auto image labeling, may be used as input data for deep learning to improve prediction accuracy.

Second, it is possible to implement semi-auto image labeling using DBSCAN, which is unsupervised learning, after extracting features through transfer learning from training image data and performing feature dimension reduction based on the t-SNE algorithm.

Although embodiments of the present invention have been described with reference to the above and the accompanying drawings, those skilled in the art, to which the present invention pertains, can understand that the present invention may be practiced in other specific forms without changing its technical spirit or essential features. Therefore, it should be understood that the embodiments described above are illustrative in all respects and not limiting.

What is claimed is:

1. A unit for inspecting a substrate comprising:
   a feature extracting module for extracting a feature from training data included in each class in response to a plurality of training data related to image data of a substrate being classified according to a predefined class;
   a validity evaluating module for evaluating validity of the feature;
   a class verifying module for verifying the predefined class; and
   a data reconstructing module for reconstructing the plurality of training data based on a feature determined as valid and a verified class,
   wherein reconstructed training data is utilized when inspecting the substrate.

2. The substrate inspecting unit of claim 1, wherein the feature extracting module extracts the features using a pre-trained model that is a result obtained by training using data related to the image data of the substrate equal to or greater than a reference amount.

3. The substrate inspecting unit of claim 1, wherein the validity evaluating module applies a dimension reduction method to the feature to evaluate validity of the feature.

4. The substrate inspecting unit of claim 3, wherein the validity evaluating module uses a t-SNE algorithm as the dimension reduction method.

5. The substrate inspecting unit of claim 1, wherein the class verifying module verifies the predefined class using a non-hierarchical cluster analysis.

6. The substrate inspecting unit of claim 5, wherein the class verifying module verifies the predefined class using a density-based clustering method.

7. The substrate inspecting unit of claim 1, wherein the class verifying module verifies the predefined class using an unsupervised learning-based cluster analysis.

8. The substrate inspecting unit of claim 1 further comprises,
   a data amount determining module for determining whether an amount of training data included in each class is equal to or greater than a reference amount.

9. The substrate inspecting unit of claim 8, wherein the feature extracting module extracts the features using a pre-trained model that is a result obtained by training using data related to the image data of the substrate equal to or greater than the reference amount in response to an amount of training data included in each class being less than a reference amount.

10. The substrate inspecting unit of claim 1 further comprises,
    a data labeling module for directly classifying the plurality of training data according to the predefined class.

11. The substrate inspecting unit of claim 1 further comprises,
    a labeling information acquiring module for receiving information on training data classified by each class and information on the predefined class.

12. The substrate inspecting unit of claim 1, wherein the plurality of training data is image data of at least one type of image data of a substrate in a good state and image data of a substrate in a defective state.

13. The substrate inspecting unit of claim 1, wherein the plurality of training data is image data of a substrate, onto which a substrate treating solution is discharged.

14. The substrate inspecting unit of claim 1 further comprises,
    a data processing module for processing the image data of the substrate in response to acquiring the image data of the substrate;
    a reference data detecting module for detecting reference data;

a data analysis module for comparing and analyzing the image data of the substrate and the reference data; and a substrate determining module for determining whether the substrate is good or defective based on an analysis result between the image data of the substrate and the reference data.

15. The substrate inspecting unit of claim 14, wherein the reference data detecting module determines a class related to the image data of the substrate from among the predefined class, and detects the reference data from among training data included in the determined class.

16. The substrate inspecting unit of claim 1, wherein the substrate inspecting unit reconstructs the plurality of training data in response to an apparatus for treating the substrate being driven at least once.

17. A unit for inspecting a substrate comprising:

a feature extracting module for extracting a feature from training data included in each class in response to a plurality of training data related to image data of a substrate being classified according to a predefined class;

a validity evaluating module for evaluating validity of the feature;

a class verifying module for verifying the predefined class; and a data reconstructing module for reconstructing the plurality of training data based on a feature determined as valid and a verified class, wherein reconstructed training data is utilized when inspecting the substrate, wherein the feature extracting module extracts the features using transfer learning of a pre-trained model that is a result obtained by training using data related to the image data of the substrate equal to or greater than a reference amount, wherein a validity evaluating module evaluates validity of the feature by applying a dimension reduction method to the feature, wherein a class verifying module verifies the predefined class using DBSCAN based on unsupervised learning, wherein the plurality of training data is image data of the substrate, onto which a substrate treating solution is discharged, and is image data of at least one type of image data in a good state and image data in a defective state.

18. An apparatus for treating a substrate comprising:

a process treating unit for supporting the substrate while the substrate is treated;

an inkjet head unit for discharging a substrate treating solution onto the substrate;

a gantry unit, in which the inkjet head unit is installed, and for moving the inkjet head unit on the substrate; and a substrate inspecting unit for inspecting the substrate;

wherein the substrate inspecting unit comprises, a feature extracting module for extracting a feature from training data included in each class in response to a plurality of training data related to image data of a substrate being classified according to a predefined class;

a validity evaluating module for evaluating validity of the feature;

a class verifying module for verifying the predefined class; and a data reconstructing module for reconstructing the plurality of training data based on a feature determined as valid and a verified class, wherein reconstructed training data is utilized when inspecting the substrate.

19. The apparatus of claim 18, wherein the feature extracting module extracts the feature using transfer learning of a pre-trained model that is a result obtained by training using data related to the image data of the substrate equal to or greater than a reference amount.

20. The apparatus of claim 18, wherein the class verifying module verifies the predefined class using DBSCAN based on unsupervised learning.

* * * * *